United States Patent

Mangold et al.

Patent Number: 5,380,687
Date of Patent: Jan. 10, 1995

[54] SILICON-ALUMINUM MIXED OXIDE

[75] Inventors: Helmut Mangold, Rodenbach; Werner Hartmann, Babenhausen; Peter Kleinschmit, Hanau; Dieter Kerner, Hanau; Thomas Rudolph, Hanau, all of Germany

[73] Assignee: Degussa Aktiengesellschaft, Germany

[21] Appl. No.: 49,311

[22] Filed: Apr. 21, 1993

[30] Foreign Application Priority Data

Aug. 28, 1992 [DE] Germany ............... 4228711

[51] Int. Cl.⁶ ............................................. C04B 35/44
[52] U.S. Cl. ..................................... 501/128; 501/153
[58] Field of Search .................. 501/128, 153; 423/327.1, 327.2, 336

[56] References Cited

U.S. PATENT DOCUMENTS

| | | | |
|---|---|---|---|
| 3,130,008 | 4/1964 | Stokes et al. | 423/336 |
| 3,954,945 | 5/1976 | Lange et al. | 423/336 |
| 4,276,274 | 6/1981 | Heckel | 423/336 |
| 4,286,990 | 9/1981 | Kleinschmit et al. | 106/696 |
| 4,297,143 | 10/1981 | Kleinschmit | 423/336 X |
| 4,491,482 | 1/1985 | Hori | 501/153 X |
| 4,572,827 | 2/1986 | Flemmert | 423/336 |
| 4,746,638 | 4/1988 | Hori et al. | 501/153 X |
| 4,806,333 | 2/1989 | Egerton et al. | 501/153 X |
| 4,960,738 | 10/1990 | Hori et al. | 423/327.1 X |
| 5,061,474 | 10/1991 | Pauli et al. | 501/153 X |

OTHER PUBLICATIONS

Gani & McPherson "Glass Formation & Phase Transformations in Plasma Prepared $Al_2O_3$–$SiO_2$ Powders," J. Mater. Sci., 12 (1977) 999–1009 (No Month).

Primary Examiner—David Brunsman
Assistant Examiner—David Sample
Attorney, Agent, or Firm—Cushman, Darby & Cushman

[57] ABSTRACT

Silicon-aluminum mixed oxide powder which is flame-hydrolytically produced and has a composition of 65 to 85% by weight $Al_2O_3$, remainder $SiO_2$ and an amorphous structure, in which each primary particle contains components of $SiO_2$ and of $Al_2O_3$, the primary particles are between 7 and 80 nm, preferably 10 and 40 nm in size and the specific surface of the powder is between 20 and 200 $m^2/g$. The powder is used for the production of mullite and sintered compacts manufactured from it.

1 Claim, 5 Drawing Sheets

1 μm

1 μm

SILICON-ALUMINUM MIXED OXIDE

The present invention relates to a silicon-aluminum mixed oxide, a mullite powder and to sintered shaped articles or compacts produced from them, as well as to methods for producing these substances.

BACKGROUND OF THE INVENTION

Mullite is a compound of aluminum oxide and silicon oxide in a proportion ($Al_2O_3$: $SiO_2$) of 3:2. Because of its good mechanical properties, it can be used at high temperatures in high-performance ceramics.

The production of highly disperse mixed oxides is described in German Patent DE 952 891 and German Patent DE 29 31 585. The production of a mullite-aluminum oxide sintered compact is described in Published German Patent Application DE 38 35 966.

It is known that the oxides of silicon dioxide and aluminum dioxide can be produced both individually and conjointly by allowing the chlorides to react in an evaporated state in an oxyhydrogen flame with the water produced in this flame, during which fine oxide is formed (See Published German Patent Application DE-A 952 891).

SUMMARY OF THE INVENTION

The present invention provides a silicon-aluminum mixed oxide powder produced in a flame-hydrolysis process, preferably pyrogenically. The powder has a composition of 65 to 85% by weight $Al_2O_3$, remainder $SiO_2$, and an amorphous structure. Each primary (i.e. non-agglomerated) particle of the powder contains components both of $SiO_2$ and of $Al_2O_3$. These primary particles are between 7 and 80 nm, preferably 10 and 40 nm, in size. The specific surface of the powder is between 20 and 200, preferably >70 to 200 m²/g.

The invention also provides a mullite powder produced from the above-mentioned silicon-aluminum mixed oxide powder. The mullite powder of the invention has a composition of 65 to 85% by weight $Al_2O_3$, remainder $SiO_2$. The mullite powder consists of primary crystallites between 20 and 400 nm in size which can be intergrown with each other; the mullite phase is substantially free of amorphous components and substantially without components of aluminum oxide, as seen by X-ray diffractometer.

The powders of the invention can also have the properties given in Table 1.

TABLE 1

| Powder | | $SiO_2$—$Al_2O_3$ mixed oxides | Mullite |
| --- | --- | --- | --- |
| $Al_2O_3$ | (% by wt.) | 65–85 | 65–85 |
| $SiO_2$ | (% by wt.) | 15–35 | 15–35 |
| Specific surface | (m²/g) | 20–200 | 10–50 |
| Primary particle size | (nm) | 7–80 | 40–400 |
| Tapped density | (g/l) | 30–90 | 200–1800 |
| Crystal phase | | amorphous | mullite |

The invention also provides a method for producing the silicon-aluminum mixed oxide powder of the invention. In this method, silicon halides and aluminum halides, preferably the chlorides, are evaporated to produce a vapor having proportions corresponding to the proportions of oxides of aluminum and silicon desired. The evaporated halides are combined with a carrier gas, e.g. nitrogen, and they are homogeneously mixed in a mixing unit with air, oxygen and hydrogen. This mixture is supplied to a burner of a known design (see, e.g., German Patent DE 974 793) and brought to reaction in a cumbustion chamber in a flame. Then the hot gases and solid produced in the reaction are subsequently cooled in a heat-exchanger unit, the gases are separated from the solid and any residual halides adhering to the product are removed by a heat treatment with moistened air.

The invention also provides a method for producing the mullite powder of the invention using the silicon-aluminum mixed oxide powder of the invention. The method consists of a sintering treatment of the silicon-aluminum mixed oxide powder at temperatures between 1100° and 1700° C., preferably at 1300–1400 and especially at 1350° C. This sintering process itself can take place either without further pretreatment of the powder or, in another embodiment, with compacted material, e.g., material compacted by means of aqueous suspension of the powder as well as selectively using a comminution or grinding following the sintering process.

The invention also provides for the use of the mullite powder of the invention for the production of ceramics and ceramic preproducts, especially for ceramic materials which are subject to high thermal and mechanical stresses.

Advantages

The high particle fineness both of the silicon oxide-aluminum oxide mixed oxide and of the mullite powder increases the sintering speed and permits sintering at lower temperatures.

The method of the invention offers several advantages for the production of mullite powders from the pyrogenic mixed oxides with a suitable stoichiometry:
1. Very pure and very fine powders can be produced.
   a) The raw materials $AlCl_3$ and $SiCl_4$, which can be used in high purity, pass via the vapor phase into the reaction chamber, with any contaminants remaining in the evaporator.
   b) The fineness of the powders can be regulated via certain process parameters. A higher fineness provides a higher sintering activity. A high sintering activity results in high sintering densities even at relatively low sintering temperatures, which results in the desired effect of a fine-grain structure of the sintered material.

The combination of these effects results in good mechanical properties.

2. In comparison to known methods for the production of mullite powder (e.g. sol-gel methods or related methods), only a few method steps are required, so that an economic product can be produced with the method of the invention.

Thus, in the known sol-gel methods and related methods, a gel is normally produced which must first be neutralized, then dried and ground. A thermal treatment of the powder follows, in the course of which the mullitization occurs. As a rule there is a further grinding of the mullitized powder.

In contrast to the known sol-gel methods, in the method of the invention the first grinding can be totally eliminated since the powder produced in the flame already exhibits a sufficient particle fineness. Furthermore, the neutralization step is eliminated and, in the case that the powder can be used without compaction in the liquid phase, the drying step which is necessary in the sol-gel method can be eliminated.

The invention will be better understood from the following description of preferred embodiments, with reference to the drawing.

front of the burner from which screen air flows out in an annular manner directed inwardly.

Table 2 shows the experimental conditions for producing the powder according to the invention.

TABLE 2

Table of the experimental conditions and analytical results in the production of silicon-aluminum mixed oxides with mullite stoichiometry.

| | | | | Air | | | | Ratio | | | $Al_2O_3$ | $SiO_2$ | Tapped |
|---|---|---|---|---|---|---|---|---|---|---|---|---|---|
| | $SiCl_4$ | $AlCl_3$ | $H_2$ | Prim | Screen | Sec. | Velocity | Charge | $H_2$ | $O_2$ | BET | weight | weight | Dens. |
| No. | (l/h) | (kg/h) | ($Nm^3/h$) | | ($Nm^3/h$) | | (m/sec) | ($g/Nm^3$) | gamma | lambda | ($m^2/g$) | percent | percent | (g/l) |
| 1 | 0.34 | 1.20 | 3.0 | 3.0 | 6.0 | 6.0 | 11.60 | 521 | 6.92 | 2.10 | 58.0 | 71.2 | 28.8 | 76 |
| 2 | 0.34 | 1.20 | 2.5 | 3.0 | 6.0 | 6.0 | 11.60 | 521 | 5.76 | 2.51 | 73.0 | 69.2 | 30.7 | 62 |
| 3 | 0.34 | 1.20 | 2.5 | 6.0 | 6.0 | 6.0 | 22.20 | 272 | 5.76 | 3.02 | 103.0 | 69.4 | 30.6 | 50 |
| 4 | 0.34 | 1.20 | 3.0 | 8.0 | 6.0 | 6.0 | 20.30 | 206 | 6.92 | 2.80 | 127.0 | 72.1 | 27.9 | 43 |

Abbreviations: Air, prim = primary air in the inner tube mixed with $SiCl_4$— and $AlCl_3$, vapor, screen = screen air from annular jet, sec. = secondary air; velocity discharge speed of the air - metal halide gas mixture in the inner tube relative to the normal state; charge = charge of the air-gas mixture of metal halide vapor ($SiCl_4$ + $AlCl_3$) ; ratio $H_2$ (gamma) = ratio of fed-in hydrogen to stoichiometrically required oxygen; ratio $O_2$ (lambda) = ratio of fed-in oxygen to stoichiometrically required oxygen; $Al_2O_3$ and $SiO_2$ contents are calculated upon the substance annealed for 2 h at 1000 C.; stamping dens. = tapped density.

BRIEF DESCRIPTION OF FIGURES OF DRAWING

DETAILED DESCRIPTION OF PREFERRED EMBODIMENT

Example

Figure 1:
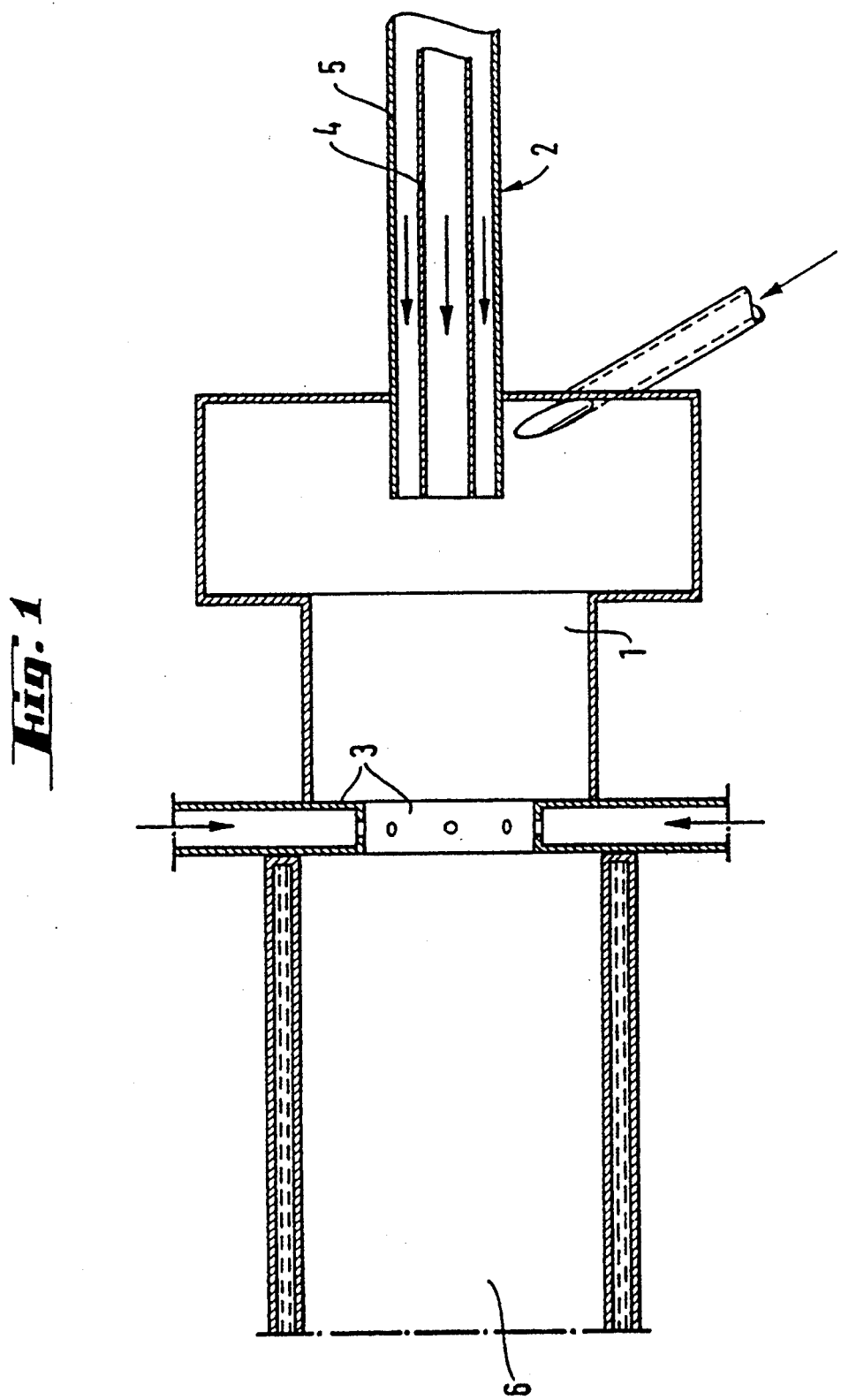
FIG. 1 is a side view, in cross section, of a burner which can be used to carry out the process of the invention.

FIG. 1 shows the burner system in schematic fashion. A double-jacketed tube 2 extends into a combustion chamber 1. Secondary air is blown into this combustion chamber. An annular screen 3 is located behind the "burning chamber", from which additional air can be introduced. The metal halide vapors and the "primary air" are guided through the inner tube 4 of the double-jacketed tube 2. In some cases, hydrogen also is introduced through tube 4. Hydrogen may also be introduced through the outer tube 5 of the double-jacketed tube 2.

The required amount of liquid $SiCl_4$ is measured with a rotameter, the $SiCl_4$ is then evaporated at a temperature of approximately 130° C. in a separate unit and then mixed with the primary air heated to approximately 300° C. This air-$SiCl_4$ mixture can be reheated to approximately 200 to 300° C. before it is guided into the double-jacketed tube. The $AlCl_3$ is evaporated in a heated solid evaporator (temperature approximately 530° C.). To this end the powdery $AlCl_3$ is charged into the evaporator with a differential metering balance. The aluminum chloride vapor is conducted with the assistance of a stream of nitrogen (100 liters per hour) into the inner tube 4 of the double-jacketed tube 2, where it is mixed with the heated $SiCl_4$-air mixture. The hydrogen necessary for the flame hydrolysis is fed either into the inner tube 4 of the double-jacketed tube 2 as well as additionally or alternatively exclusively (selectively also preheated) into the outer tube 5 of the double-jacketed tube 2.

The flame burns in the shape of a tube into a water-cooled flame tube 6. An annular screen 3 is located in front of the burner from which screen air flows out in an annular manner directed inwardly.

The specific surface of the mullite preproduct powder can be affected by various actions. Potential variable parameters are, among others, the air-hydrogen ratio and the discharge speed of the gases. After having passed through a burner, the pyrogenically produced powders are separated from the gases containing hydrochloric acid according to known methods e.g. in a filter or by cyclones.

The powder can be freed of adhering residues of hydrochloric acid in a further step by a thermal treatment. However, this is not absolutely necessary in order to use the powder in accordance with the invention as a mullite preproduct.

Figure 2:
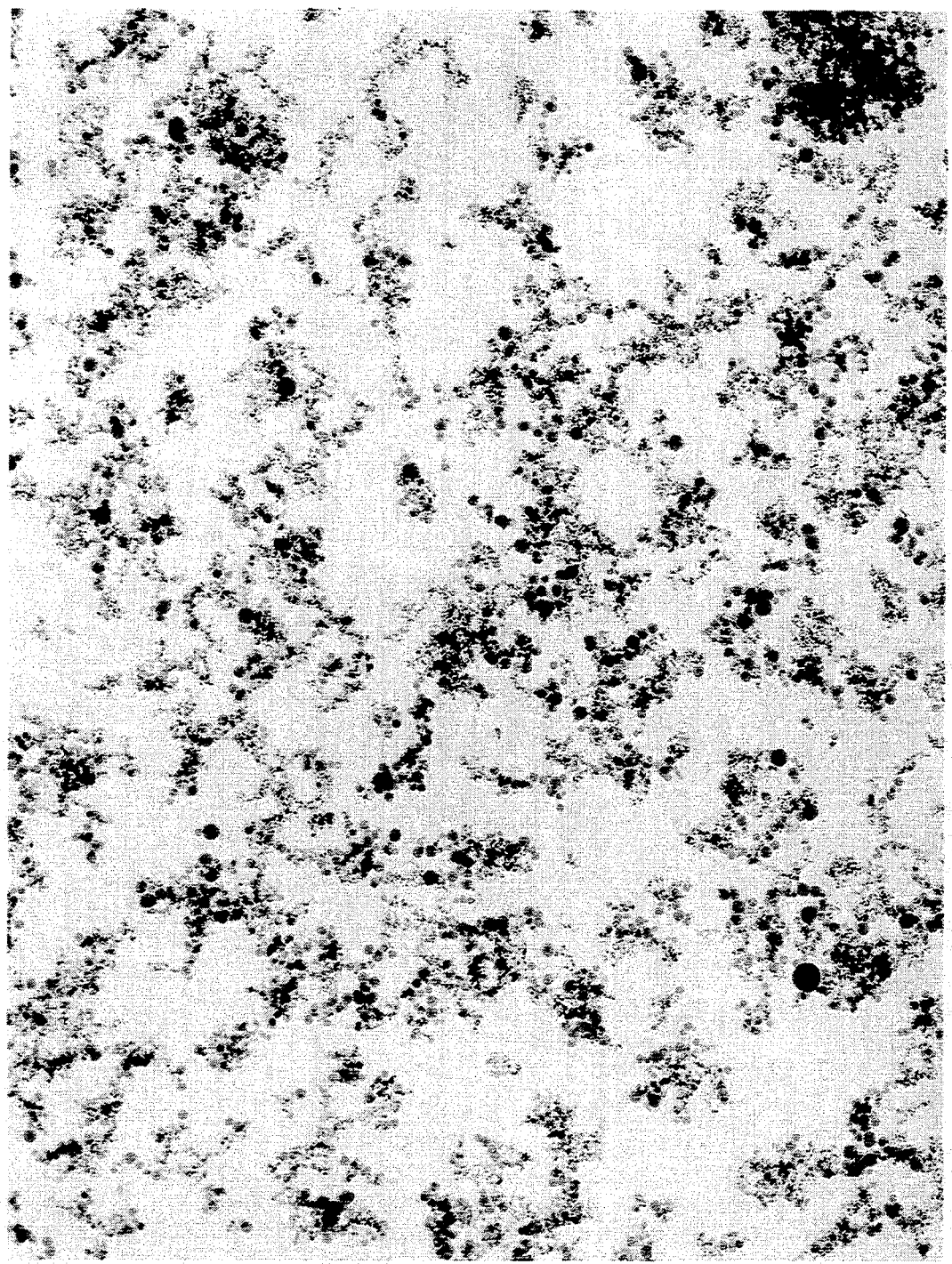
FIG. 2 is an electron micrograph of the mixed oxide powder produced in Example 4.

FIG. 2 shows an electron-microscope micrograph of the mullite preproduct powder as produced in accordance with the described method and the experimental conditions of Example 4.

FIG. 2 shows that circular primary or individual particles are present in the powder which are intergrown with each other so as to form raspberry-like structures.

X-ray diffraction examinations show that the analyzed spheres are composed of alternating components of silicon dioxide and aluminum oxide, with no relationship being recognizable between the composition of the spheres and their diameter.

Figure 3:
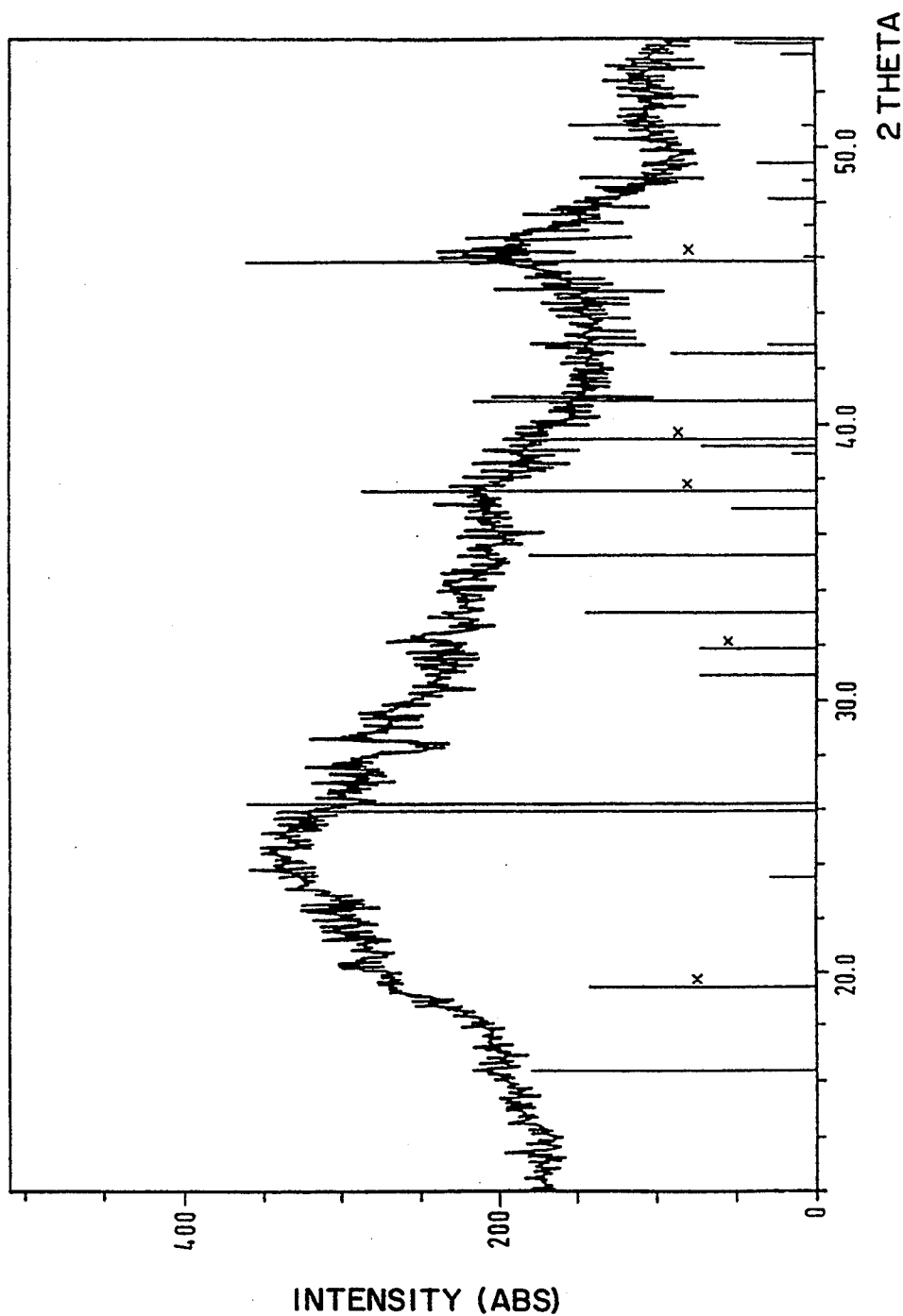
FIG. 3 is an X-ray diffraction pattern of the mixed oxide powder produced in Example 4.

The X-ray diffraction pattern of the preproduct powder (Example 4), shown in FIG. 3, shows no crystalline components of mullite or of aluminum oxide.

Examples for the Mullitization of the Preproduct Power

The high-surface powders are subjected to a sintering treatment. The powder is compacted in a pre-compaction step. The powder is suspended in water and then dried at 120° C. The dried mass is annealed for 3 and 12 hours at 1350° C. The annealed substance is comminuted in a mortar.

The powders produced according to this method are suitable as powders for the production of ceramic components.

TABLE 3

| | Specific surface BET ($m^2/g$) | | |
|---|---|---|---|
| Annealing Time Product | Without Annealing | 3 hours | 12 hours |
| 1 | 58 | 25 | 22 |
| 2 | 73 | 27 | 24 |
| 3 | 103 | 31 | 26 |

TABLE 3-continued

| | Specific surface BET (m²/g) | | |
|---|---|---|---|
| Annealing Time Product | Without Annealing | 3 hours | 12 hours |
| 4 | 127 | 31 | 27 |

Figure 4:
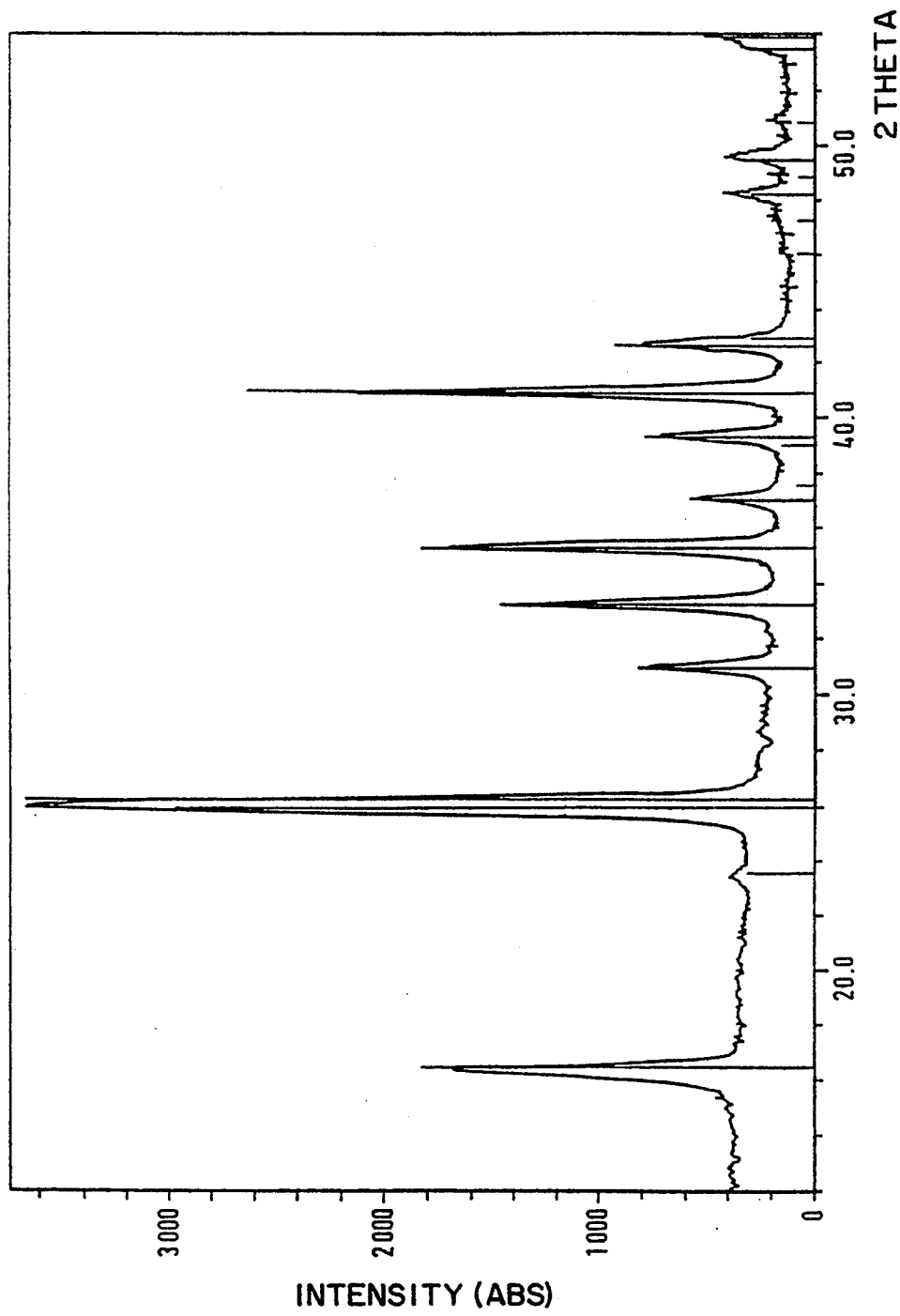
FIG. 4 is an X-ray diffraction pattern of the mullitized powder of Example 4.

FIG. 4 shows the X-ray diffraction pattern of the powder of Example 4, which was suspended in an aqueous medium after the pyrogenic production, the suspension then dried and the compacted material then annealed 12 hours at 1350° C.

Figure 5:
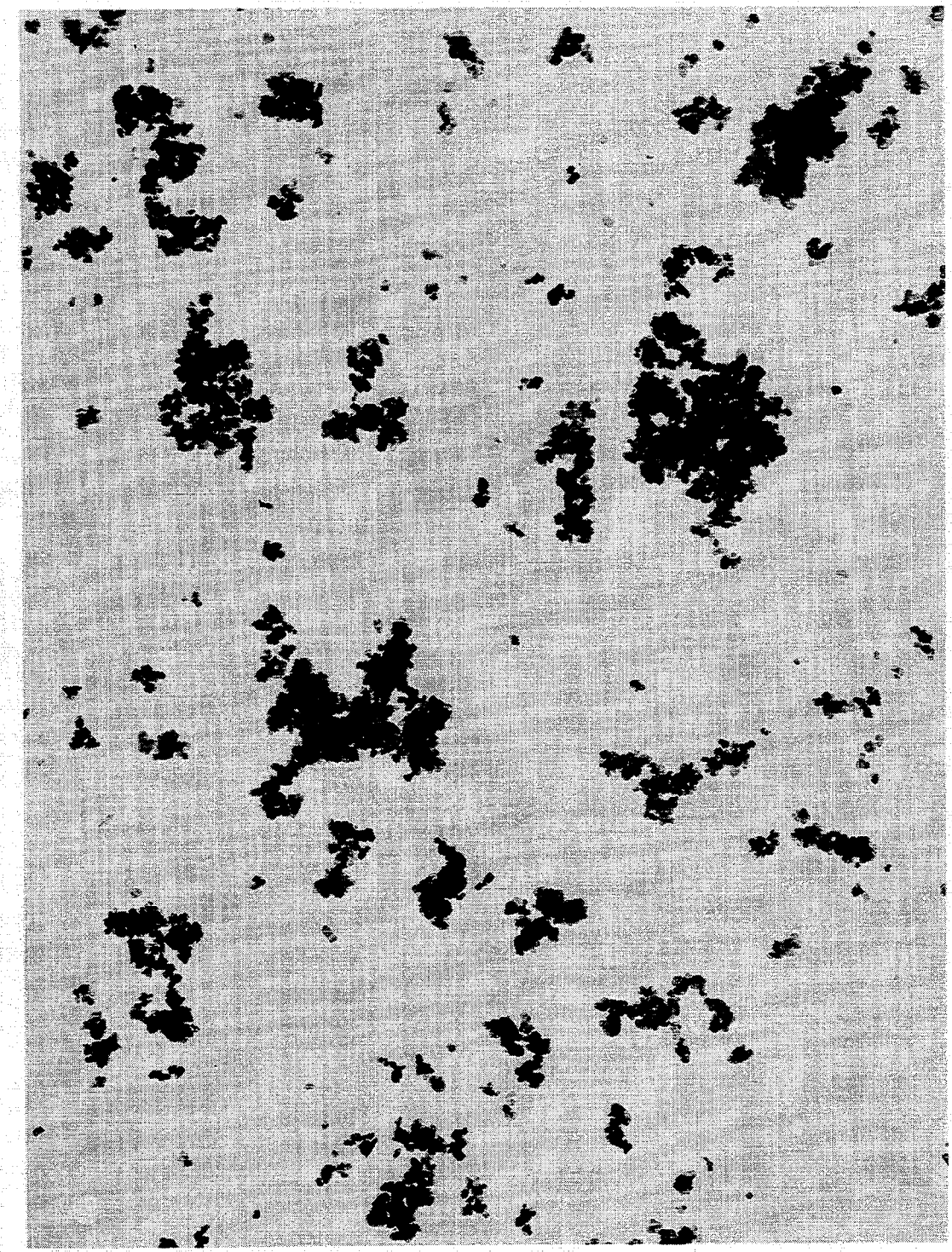
FIG. 5 is an electron micrograph of the mullitized powder of Example 4.

FIG. 5 is an electron micrograph of the material treated in this manner, which was comminuted in a mortar after sintering.

The size distribution of the mullitized particles, which is favorable for the sintering process, is clearly recognizable.

The preproduct powders of Examples 1, 3 and 4 and in accordance with the invention were suspended in water and spray-dried. The spray-dried powders had the following bulk densities and tapped densities:

TABLE 4

| Densities of the spray-dried powders | | |
|---|---|---|
| Powder according to example | Bulk density (g/l) | Tapped density (g/l) |
| No. 1 | 343 | 447 |
| No. 3 | 256 | 323 |
| No. 4 | 225 | 276 |

The spray-dried powders were isostatically pressed at room temperature with a pressure of 200 MPa to tablets with a diameter of 13 mm and a height of approximately 20 mm.

These tablets were sintered in air in a chamber kiln according to the following sintering program:

Starting at room temperature, a temperature of 1300° C. is reached with a heating rate of 250 K/h and is maintained for 6 hours, then the temperature is increased with a heating rate of 120 K/h to 1620° C. and this temperature maintained for 10 hours. The temperature is thereafter reduced to room temperature.

The density of the spray-dried and sintered specimens is determined according to the buoyancy method, with a theoretical density of 3.156 g/cm³ taken as base for mullite.

Over 99% of the theoretical density of mullite was achieved even for the specimens which were isostatically pressed when cold, then suspended, spray-dried and sintered (cf. Table 5).

TABLE 5

| Density of the spray-dried and sintered specimens | |
|---|---|
| Powder according to Example | Density (% of theoretical) |
| No. 1 | 99.10 |
| No. 3 | 99.14 |
| No. 4 | 99.30 |

What is claimed is:

1. A mullite powder having a composition of 65 to 85% $Al_2O_3$, remainder $SiO_2$, said mullite powder consisting essentially of crystallites between 40 and 400 nm in size which can be intergrown with each other and in which the mullite phase is without amorphous components and without components of aluminum oxide as determined by an X-ray diffraction pattern, said mullite powder being produced by a method which comprises heating, at a temperature between 1100° and 1700° C., a silicon-aluminum mixed oxide powder produced by flame-hydrolysis which has a composition of 65 to 85% $Al_2O_3$, remainder $SiO_2$, said silicon-aluminum mixed oxide powder having an amorphous structure, each primary particle containing components of both $SiO_2$ and $Al_2O_3$, the primary particles being between 7 and 80 nm in size and the specific surface of the powder being between 20 and 200 m²/g.

* * * * *